April 26, 1938. J. J. BLACK 2,115,440
TRAILER TRUCK FRAME
Filed July 27, 1936 2 Sheets-Sheet 1

INVENTOR.
BY James J. Black
Wood & Wood
ATTORNEYS

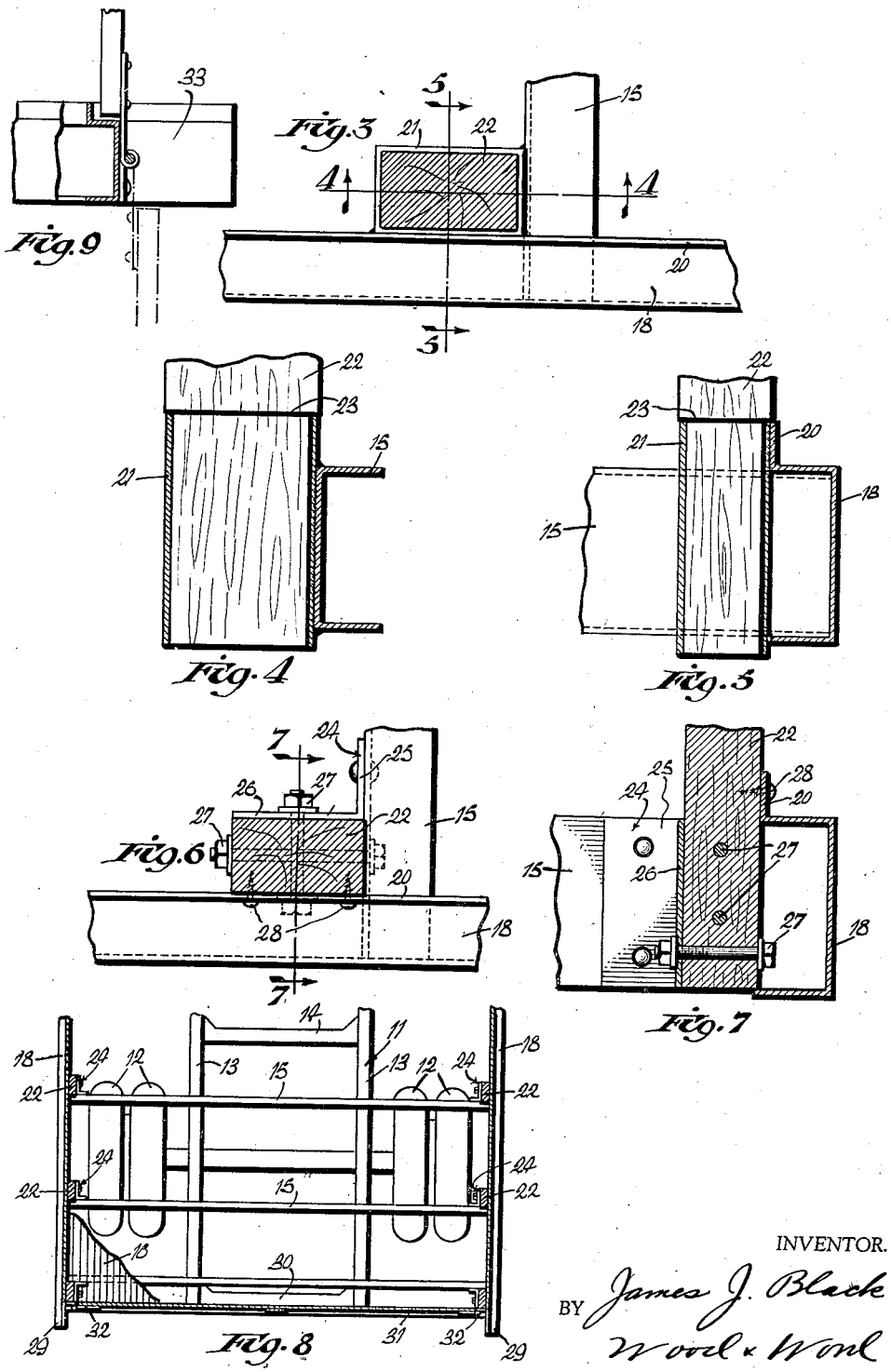

Patented Apr. 26, 1938

2,115,440

UNITED STATES PATENT OFFICE 2,115,440

TRAILER TRUCK FRAME

James J. Black, Cincinnati, Ohio, assignor to The Trailer Company of America, Cincinnati, Ohio, a corporation of Delaware Application July 27, 1936, Serial No. 92,718

2 Claims. (Cl. 296—43)

This invention relates to truck or trailer bodies, and is particularly directed to an improved wide metal frame or platform therefor.

Heretofore, in order to procure the proper stability in a wide frame it has been necessary to provide a heavy outside member. This has been necessary particularly in cases where stake sockets or body pillars were provided, since the stake pockets were fastened to the outside member and because of the pressures exerted by the load, and the leverage possible on long stakes caused twisting of the outside member, badly disaligning the sides of the body.

It is the object of the present invention to provide a trailer or truck body incorporating a wide frame wherein it is no longer necessary to provide a heavy outside member due to an improved arrangement of the stake sockets or pockets with relation to the cross bolsters. The present invention provides relatively light but rigid fastenings for the stakes or body pillars of the truck. The arrangement of the stake sockets and the stakes is such as to provide that any twisting action on the stakes or body pillars is taken by the cross bolsters.

It is a further object to provide this arrangement in conjunction with a rub or guard rail surrounding and protecting the supported stake pockets and bolsters in lieu of a heavy body member. The arrangement is such that a blow to the rub rail does not tend to throw the pockets out of line since they are attached to the cross bolsters.

It is a further object to provide a rub rail of a form which provides a metal floor edging and an arrangement permitting countersinking of the floor in the rub rail, which thereby prevents injury to the edges of the floor, particularly when used as a platform. In other words, the rub rail binds the flooring.

It is a further object of this invention to provide a frame which provides rearwardly extending portions functioning as bumpers for protecting the tail gate in either the up or down position, or the closure in closed position, in those instances where a body is provided on the frame.

Accordingly, the present concept is the provision of an improved assembly of stakes or body pillars, cross bolsters and guard rail as used in a wide frame, whereby the stakes, closure, and their attachment means are protected by the rub rail and any strains or pressures on the stakes are carried by the bolsters, eliminating the necessity for a heavy outside frame member.

Other objects and further advantages will be more fully apparent from a description of the accompanying drawings, in which:

Figure 3 is a fragmentary sectional view taken on line 3—3, Fig. 2, illustrating a stake or body pillar and its socket in detail.

Figure 4 is a sectional view taken on line 4—4, Fig. 3, further detailing the socket.

Figure 5 is a sectional view taken on line 5—5, Fig. 3, showing the socket in relation to the rub rail.

Figure 6 is a sectional view taken similar to Figure 3, but showing a modified arrangement of the stake or body pillar.

Figure 7 is a sectional view taken on line 7—7, Fig. 6, illustrating the relation of the stake or body pillar to the rub rail.

Figure 8 is a fragmentary sectional view taken on the horizontal plane through the rear portion of a trailer or truck frame, illustrating the arrangement of the rub rail, whereby it serves to protect the tail gate.

Figure 9 is a fragmentary view illustrating the tail gate in relation to the bumper projections, the tail gate being shown in down position in dot and dash lines.

Figure 1:
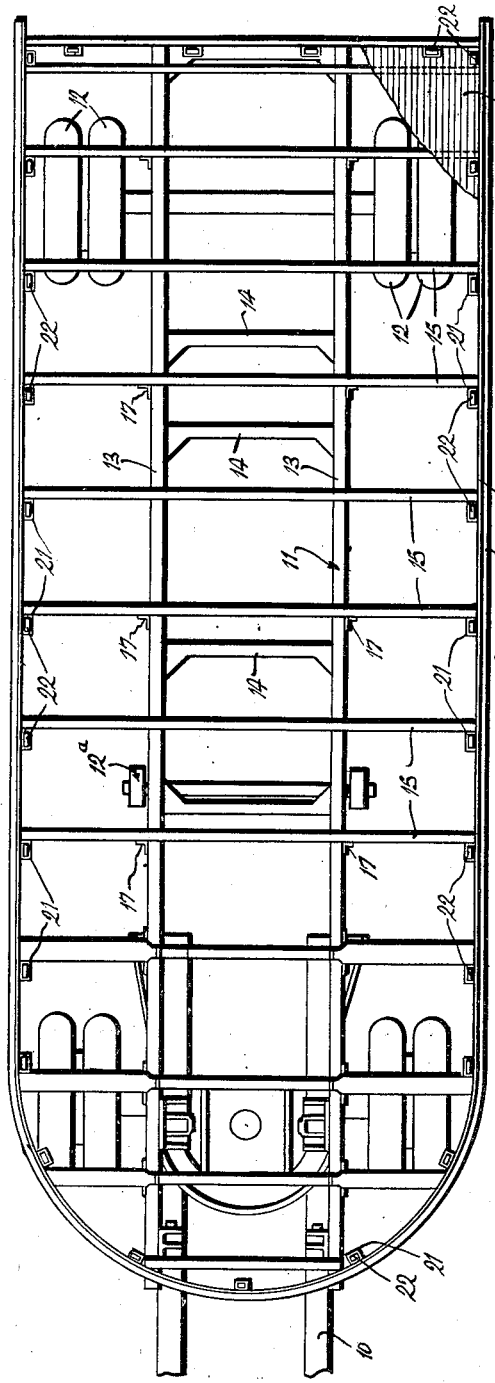
Figure 1 is a top plan view of the improved trailer or truck frame.
Figure 2:
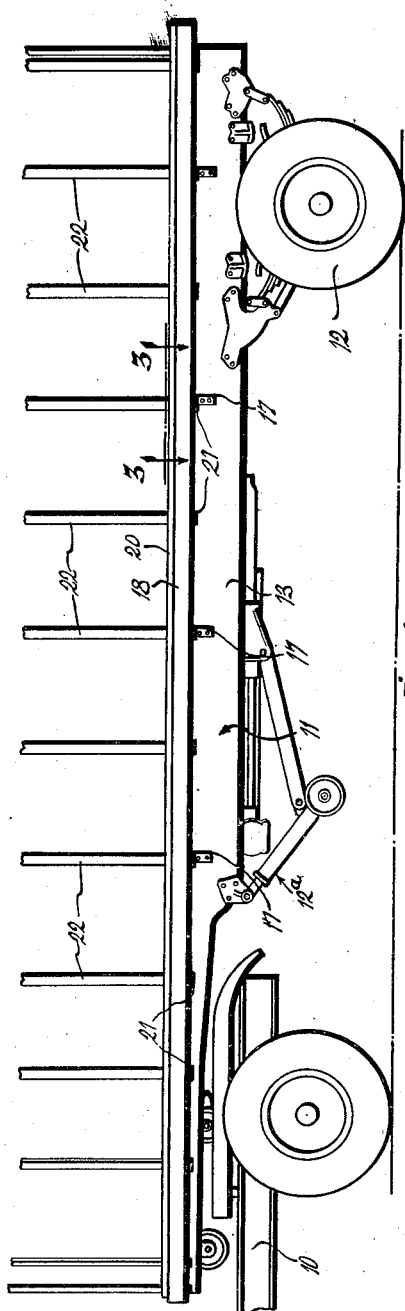
Figure 2 is a side elevation of a truck or trailer incorporating the improved frame.

Referring to the drawings, it will be observed that the improved frame of this invention is shown as incorporated in a standard form of trailer for the purpose of showing an environment. The rear end of the tractor or truck which supports and moves the trailer is indicated at 10. The chassis of the trailer is indicated at 11, incorporating wheels 12 at its rear end and a prop 12ᵃ arranged at its forward end. Heavy channel frame elements 13 and cross frame elements 14 make up the chassis, the frame elements 13 being relatively closely spaced so as to fit between the wheels of the trailer.

The present invention is directed entirely to the structure of the frame or platform and for this reason the details of the chassis are not described.

Broadly speaking, the frame comprises a multiplicity of bolsters 15 supported crosswise on the chassis frame elements 13, 13, and flooring 16 consisting of planks laid lengthwise of the trailer body. The bolsters in the present disclosure are formed of channel iron pieces and are of a length providing a trailer frame substantially twice as wide as the chassis. The bolsters are secured to the chassis by means of angle iron pieces 17.

A rub rail 18, which is of light construction and is in no sense requisite to the rigidity of the trailer frame, extends around the ends of the bolsters providing an edging for the planking making up the flooring of the frame. The rub rail may be described generally as of channel form, the ends of the bolsters projecting at right angles into the inwardly facing channel of the rub rail as shown in Figure 5.

The rub rail includes an upwardly turned flange 20 along the inner edge of its upper arm, which flange is of a height equal to the thickness of the flooring. The flange therefore provides a metal binding or edging for the flooring protecting the same against the crushing effect of blows delivered to the sides of the frame during use. The rub rail is fastened to the bolsters through the medium of the stake sockets or pockets in one instance, or through the medium of the stakes or body pillars and angle iron pieces in the other instance. In the first instance the sockets are in the form of square tubes 21 lying in the corners afforded by the junctures of the bolsters and the rub rail. The tops of the square tubes forming the sockets are in the same plane as the upper edge of the flange 20 and the bottom edges thereof may be disposed slightly below the rub rail. These sockets are welded to the bolsters. The upwardly turned flange 20 of the rub rail as well as the edge of the lower flange of the rub rail if desired are welded to the sockets (see Figure 5).

The stakes or body pillars shown at 22 include shoulders 23 which rest against the upper ends of the stake sockets and limit insertive movement of the stakes or body pillars into the sockets.

The attachment of the stake sockets, as will be apparent, is entirely to the bolsters. Accordingly, blows delivered to the rub rail will not affect or disalign the stake sockets. Pressures exerted against the stakes or body pillars will be taken by the bolsters so that there is no necessity for provision of a heavy outside frame member, the rail 18 provided functioning solely for the purpose of a guard rail for protecting the ends of the bolsters and providing an edging for the flooring.

In the modified arrangement the stakes or body pillars are located in the same manner as in the first form except that they are secured directly to the bolsters. An angle iron piece 24 is provided in each case of the same height as the height of the bolster having one flange 25 riveted to the bolster and the other 26 lying against the inner side of the stake or body pillar.

Bolts 27 secure the stake or body pillar in position, certain of the bolts extending through the stake or body pillar and the bolster and others through the stake or body pillar and the angle iron piece (see Figure 6). The rub rail caps the ends of the bolsters in the same manner as in the preceding form, the upturned flange being secured to the stakes by means of wood screws 28. Here again it will be observed that the stakes are rigidly fastened to the bolsters, the rub rail protecting the stakes and bolsters against blows encountered in usage, the twisting strains and stresses applied through the stakes being taken by the bolsters.

As shown in Figure 8, the rear ends 29 of the rub rail, which is preferably a single strip extended continuously around the front of the trailer frame, extend beyond the last bolster 30 to provide projections functioning as bumpers. The tail gate 31 for the trailer body is set within these projections so as to be protected by them. As shown in Figure 8, the closure elements are hinged to body pillars, the hinges 32 being located in the corners afforded by the projections and the pillars, and thus being amply protected.

As shown in Figure 9, the projections 33 of the rub rail protect the tail gate in either up or down position.

Having described my invention, I claim:

1. An improved metal frame adapted to be supported on the chassis of a trailer or truck comprising a series of cross bolsters disposed upon the chassis, stake sockets rigidly secured adjacent the ends of the bolsters, stakes mounted in said sockets, a guard rail disposed around the ends of the bolsters and capping the same, said guard rail secured against displacement, said bolsters, stake sockets and guard rail constructed and arranged so that the stake sockets and bolsters form the basic rigid structure and blows delivered to the guard rail do not disalign the stake sockets, and so that the guard rail protects the extended ends of the bolsters.

2. An improved metal frame adapted to be supported on the chassis of a trailer or truck comprising a series of cross bolsters disposed upon the chassis, angles rigidly secured adjacent the ends of said cross bosters, vertical stakes rigidly secured to the cross bolsters and angles, and a channel shaped rub rail applied around the ends of the bolsters, said parts so disposed and arranged that stake strains occur directly on said bolsters and angle fastenings, and rub rail blows are dissipated on the ends of the bolsters.

JAMES J. BLACK.